May 18, 1943. R. J. GARVEY 2,319,315
HEATING SYSTEM
Filed Dec. 30, 1939 3 Sheets-Sheet 1
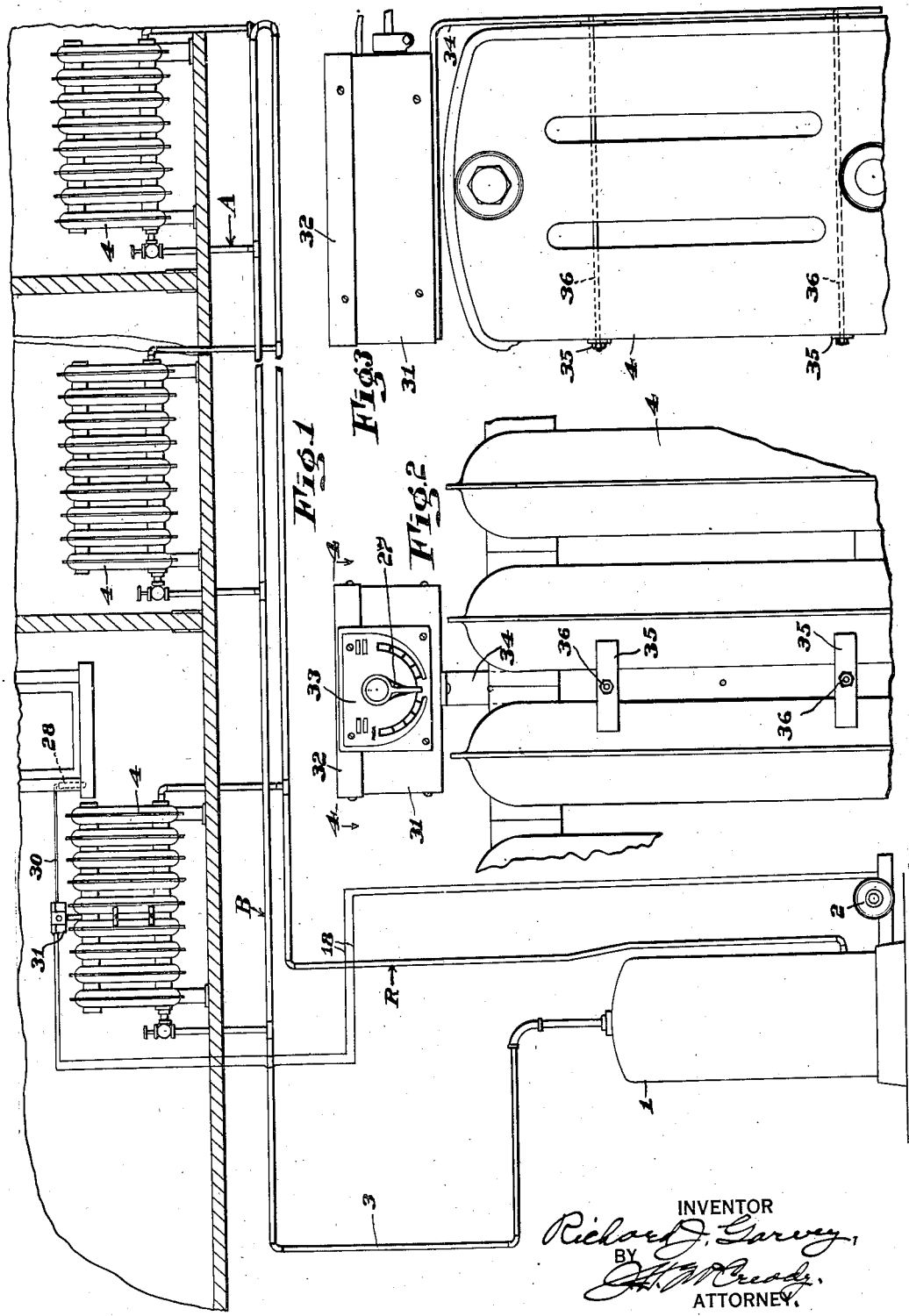
INVENTOR
Richard J. Garvey,
BY
ATTORNEY.

May 18, 1943. R. J. GARVEY 2,319,315
HEATING SYSTEM
Filed Dec. 30, 1939 3 Sheets-Sheet 2

INVENTOR
Richard J. Garvey,
BY
ATTORNEY

May 18, 1943.  R. J. GARVEY  2,319,315
HEATING SYSTEM
Filed Dec. 30, 1939  3 Sheets-Sheet 3
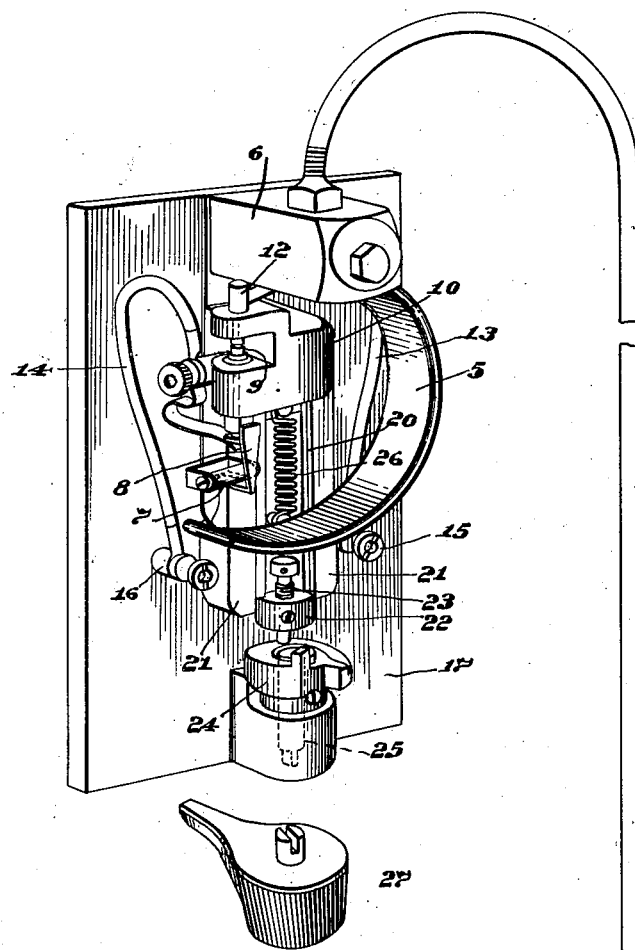
Fig. 6
INVENTOR
Richard J. Garvey,
BY
ATTORNEY.

Patented May 18, 1943

2,319,315

UNITED STATES PATENT OFFICE 2,319,315

HEATING SYSTEM

Richard J. Garvey, Dorchester, Mass.

Application December 30, 1939, Serial No. 311,792

5 Claims. (Cl. 236—91)

This invention relates to steam, water and vapor heating systems hereinafter, for convenience, referred to collectively as "steam heating systems," and it is more especially concerned with the control of operations of such systems.

In heating large buildings, such as apartment houses, office buildings, and the like, much difficulty is experienced in maintaining the desired degree of temperature throughout the building. This is particularly true in mild weather because most buildings are equipped with sufficient boilers, radiation and piping to deliver 70° in zero weather. Most heating plants now operating are dependent on manual control to determine the amount of heat required. While various automatic control systems of a thermostatic nature have been devised to satisfy these requirements, few, if any, so far as I have been able to learn, have proved entirely satisfactory, and those which have gone into use to any substantial degree have been so organized that they are expensive and must be installed by engineers or service men highly skilled in that work. This fact necessarily adds materially to the initial expense of the installation and frequently, also, to the upkeep; and such expense is a serious obstacle to their introduction and use.

The present invention is especially concerned with the foregoing considerations and with the problems presented by them. It aims to improve the apparatus for controlling heating systems with a view to simplifying their construction and reducing both the initial cost of installation and the subsequent maintenance of such apparatus.

The nature of the invention will be readily understood from the following description when read in connection with the accompanying drawings, and the novel features will be particularly pointed out in the appended claims.

In the drawings,

Figure 1 is a diagrammatic view of a portion of a heating system organized and controlled in accordance with this invention;

Figs. 2 and 3 are side and end views, respectively, illustrating parts of a controlling system embodying features of this invention;

Fig. 6 is a perspective view of a thermostat of the type preferably used in this system.

Figure 4:
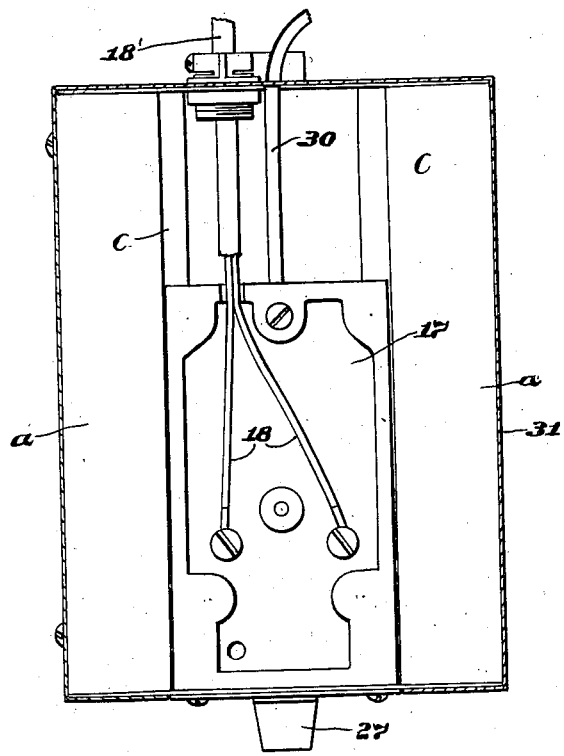
Fig. 4 is a horizontal, sectional view approximately on the line 4—4, Fig. 2.

Referring first to Fig. 1, the heating system there shown comprises a steam generator including a boiler 1 equipped with an oil burner 2. This generator may be of any suitable type or it may be replaced with any other source of steam supply such, for example, as that furnished by a central heating station. Leading from the generator is a riser or main supply pipe 3 for conducting steam to the distributing pipes leading to the various radiators or to groups of radiators. Some of these radiators are indicated at 4.

A thermostatic controlling apparatus or unit is provided for this system and this instrument also may take various forms. Preferably, however, it is of the general type shown in Fig. 6. It comprises a Bourdon tube 5, the upper end of which is secured rigidly to a hollow fixture or fitting 6 adapted to hold a quantity of some suitable temperature responsive fluid such, for example, as alcohol or a light petroleum distillate. The Bourdon tube communicates with the space in the fixture 6 and is filled with the same fluid. Attached to the free end of the Bourdon tube is a roll 7 operating in a stirrup 8 to which is secured the lower end of a slidable plunger or movable contact 9. This element is guided in a bracket 10, which is normally stationary, and this bracket supports a stationary contact 12 in alignment with, and in cooperative relationship to, the movable contact 9. Conductors 13 and 14 lead from the respective contacts 9 and 12 to binding posts 15 and 16, both mounted on the supporting panel 17. By connecting these terminals into the control circuit of the burner 2, as by means of the conductors 18, Fig. 1, this thermostat may be made to govern the operation of the burner and thereby to control the supply of steam to the radiators.

In order to provide for the adjustment of the relationship between the contacts and the temperature responsive means for actuating them, the bracket 10 is mounted on a slide 20, Fig. 6, running in grooved ribs 21—21 fast on, or integral with, the panel 17, and the lower end of this slide is provided with an integral lug 22 through which a screw 23 is threaded. The lower end of this screw bears on a cam 24 mounted fast on the upper end of a vertical shaft 25, so that by rotating this shaft the circular or spiral upper cam face of the part 24 is moved under the screw 23 and thus operates to raise or lower the slide with the contact 12 which it carries. A coiled spring 26 secured at its upper end to the slide and at its lower end to a pin anchored in the panel 17, holds the screw 23 constantly in engagement with the face of the cam 24. A central slot in the slide 20 accommodates the screw by which it is fastened to the panel. Preferably the handle 27, by means of which the shaft 25 is revolved, has a slot and tongue connection with said shaft, or is otherwise made conveniently removable therefrom.

The part of the instrument above described is customarily referred to as its "head," and this instrument is mounted closely adjacent to one of the radiators. It also includes, however, a container or bulb 28, Fig. 6, connected to the fitting 6 by means of a capillary tube 30, and this bulb is designed to be placed out of doors, or in some location where it will be promptly responsive to changes in the outdoor temperature.

Figure 5:
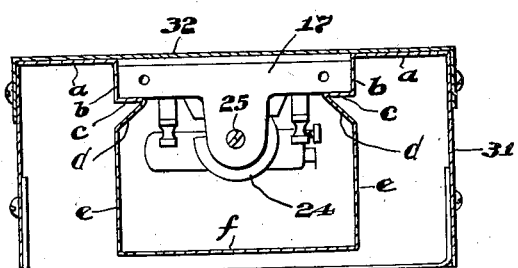
Fig. 5 is a vertical, sectional view through the apparatus shown in Fig. 4.

In installing the thermostat I have found that no satisfactory result is obtained by mounting it in any location where it is directly in contact with the radiator, but that exceptionally satisfactory results can be produced when it is spaced from a radiator selected for control purposes in such a relationship thereto that it receives heat only indirectly through an air space. Both for this reason, and also to simplify the matter of proper installation, I have provided a casing of novel form in which the head of the instrument is mounted and which will ensure its being properly spaced from the radiator. Referring to Figs. 3 to 5 it will be observed that the casing comprises a sheet metal box 31, open at its bottom, with a cover 32 fastened thereto in any convenient manner, as by screws. The top of the part 31 includes horizontal pieces a—a directly underlying the cover. At their adjacent edges the metal is bent downwardly to form parts b—b, Fig. 5, next horizontally to provide narrow shoulders c—c, and then diagonally to form inclined diverging parts d—d. From the lower edges of these parts vertical sides e—e descend and meet the edges of a floor or bottom f. This whole box structure 31 may conveniently be made from a single sheet of metal. The head of the instrument is supported in an inverted position in this casing, as shown in Figs. 4 and 5, the panel 17 resting on the shoulders c—c, as there illustrated, and being held in position partly by the portions b—b and partly by the cover 32. The capillary tube 30 and the cable 18' in which the conductors 18—18 are included, are led through the back of the casing. At its forward or front end the casing preferably includes a plate 33, Fig. 2, bearing a scale to coöperate with the pointer formed integral with the knob 27.

This casing may be supported in any convenient manner, preferably out of contact with the radiator and independently of it, but in a position directly over it, so that the heated air rising from the radiator will flow through the open bottom of the box and around the floor f and walls e—e of the instrument chamber between said walls. It may be supported in this position by any suitable form of bracket attached to the wall. The bracket shown at 34 may be used in this manner, or if more convenient, this bracket may be secured to the radiator by means of plates 35—35, Figs. 2 and 3, and screw-threaded rods 36—36.

In installing this system the head of the instrument supported in the casing 31 may be mounted on any convenient radiator and the outdoor bulb 28 may be placed just outside a window, in some location where the sun will not shine on it, but in which it will be freely exposed to the circulation of the outdoor atmosphere. As above stated, the head of the instrument is mounted in such a position that it is not responsive directly to changes in the temperature of the radiator, but is responsive to such changes in the air rising from the radiator. Thus the effect of changes of the temperature of this air is balanced up with that of the changes in temperature of the outdoor atmosphere. The volume of thermo-responsive liquid in the bulb 28 should be made somewhat greater than that in the head of the instrument.

In initially making the installation it may be necessary to experiment somewhat with the adjustment of the knob 27 which controls the operative relationship between the closing and opening of the control circuit and the Bourdon tube. That is, the customary condition which the apparatus is particularly intended to meet is that of maintaining a minimum temperature of 70° in all of the rooms of the building being heated with any temperature outdoors above zero, or thereabouts. Naturally some rooms will not heat as rapidly as others. Consequently, the thermostat must be adjusted to meet the requirements of different installations. Such adjustment, however, is very simple. It is merely necessary when the heating system is first started up, and with the control lever or knob 27 set at a middle position, as shown in Fig. 2, to note whether the general temperature throughout the building, and particularly in those rooms which may be more difficult to heat under the conditions obtaining at that particular time, come up to a temperature of 70°, or slightly more, at the time that the instrument shuts down the burner. If it is found that some rooms lag behind that in which the instrument is mounted, then the lever 27 should be moved somewhat toward the left or high region. On the other hand, it may be found that the radiator selected for control purposes will lag behind the rest of the building, in which case the lever should be moved toward the low point. A little experimenting and adjusting will soon determine the proper setting. The knob then may be removed and retained by the janitor or engineer.

It is not necessary to attach the instrument head to a radiator, but it can be applied to any convenient point on the heating system, including the heating mains, returns, or risers. This is an important advantage for the reason that it frequently is not necessary to go out of the basement in order to make the installation and, in any event, the expense of installation can be substantially reduced as compared to that required with the prior art control systems designed to accomplish similar results.

The spacing of the head of the instrument above the radiator by a distance of, say, an inch or thereabouts, provides the lag or time interval approximately necessary to allow steam to flow through the entire system and to heat up all the radiators before the thermostat shuts down the burner. The additional adjustments required will depend upon the peculiarities of individual installations. The head of the instrument is mounted in a closed chamber where it and the contacts which form part of it are protected from dust.

This system has proved very satisfactory in practice. The instrument may be manufactured at a reasonable expense, and its installation and adjustment are so simple that an intelligent janitor or engineer can perform these operations satisfactorily merely by following printed instructions. Thus the expense of employing an expert for this work may be saved, together with the travelling and other expenses incidental to the employment of highly skilled help of this type. A further economy in installation is effected by the fact that it is not necessary to position the casing 31, Fig. 1, in which the head of the instrument is housed, adjacent to a radiator but, on the contrary, it may be located on, or closely adjacent to, any other element of the steam circulating system such, for example, as on the supply main at any convenient point as, for instance, that indicated at B, Fig. 1, or on a riser, as at A, or even on a return pipe, as at R. This flexibility in mounting of the head of the control unit follows from the fact that this instrument does not depend for its operation on room temperature, but so controls the supply of the heating medium to the rooms as to maintain the desired temperature conditions in the rooms.

The element at the source of heat supply which is controlled by this apparatus necessarily will vary with the nature of the heating system, but practically any of the more common systems can be controlled by apparatus embodying this invention. Usually such an element consists of a motor either for operating a burner, a motorized valve, or the like, a damper, or some other apparatus involving an electric or electro-magnetic unit. In the case of buildings supplied from an outside central heating plant the building may be divided from a heating standpoint into zones or sections, each supplied from its own main. In that event the controlling element commonly is a motorized regulating valve which can be governed by a controlling apparatus such as that herein shown and described.

While I have herein shown and described a typical embodiment of my invention, it will be understood that the invention may be embodied in other forms without departing from the spirit or scope thereof.

Having thus described my invention, what I desire to claim as new is:

1. In a steam heating system, the combination with a steam supply and a series of radiators connected therewith and supplied therefrom, of means for controlling the delivery of steam to said radiators including a thermostat, said thermostat containing a body of temperature responsive fluid located at the head of the instrument and a bulb containing a second body of said fluid located remote from the first body but connected therewith by capillary tubing, said bulb being located in such a position that it responds promptly to changes in temperature of the outdoor atmosphere, means providing a predetermined heat lag comprising a casing in which the head of the thermostat is mounted and means for supporting the casing containing the head of said thermostat closely adjacent to, but spaced from, an element of said steam circulating system whereby the thermostat responds to the temperature changes of said element with a time lag predetermined by the spacing from said element.

2. In a heating system according to preceding claim 1, a casing in which said thermostat is mounted, said casing being open at the bottom, said supporting means including a bracket adapted to be secured to said element for adjustment relatively thereto.

3. In a heating system according to preceding claim 1, a construction in which said means for supporting the thermostat includes a casing positioned for the free circulation therearound of the air heated by said element, the casing having a chamber therein for the head of said instrument and in which it is shielded from direct contact with said air.

4. In a heating system according to preceding claim 1, a construction in which said casing is open at one side thereof, means supporting said casing with said open side positioned to receive heat directly from said element and the head of the instrument being mounted in spaced relationship to said open side of the casing.

5. In a steam heating system, the combination with a steam supply and a series of radiators connected therewith and supplied therefrom, of means for controlling the delivery of steam to said radiators including a thermostat, said thermostat containing a body of temperature responsive fluid located at the head of the instrument and a bulb containing a second body of said fluid located remote from the first body but connected therewith by capillary tubing, said bulb being located in such a position that it responds promptly to changes in temperature of the outdoor atmosphere, means providing a predetermined heat lag comprising a casing in which the head of said thermostat is mounted, and means supporting said casing with the head of said thermostat positioned closely adjacent to but spaced from an element of said steam circulating system, said casing being open at one side thereof to receive air heated by said element, and the head of the instrument being mounted in said casing in spaced relationship to said open side of the casing.

RICHARD J. GARVEY.